United States Patent
S V et al.

(10) Patent No.: US 9,147,226 B2
(45) Date of Patent: Sep. 29, 2015

(54) METHOD, APPARATUS AND COMPUTER PROGRAM PRODUCT FOR PROCESSING OF IMAGES

(71) Applicant: Nokia Corporation, Espoo (FI)

(72) Inventors: Basavaraja S V, Bangalore (IN); Veldandi Muninder, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/012,006

(22) Filed: Aug. 28, 2013

(65) Prior Publication Data

US 2014/0072231 A1    Mar. 13, 2014

(30) Foreign Application Priority Data

Sep. 10, 2012  (IN) .............. 3731/CHE/2012

(51) Int. Cl.
G06K 9/32 (2006.01)
G06T 3/00 (2006.01)
G06T 3/40 (2006.01)

(52) U.S. Cl.
CPC ............. *G06T 3/0012* (2013.01); *G06T 3/4038* (2013.01)

(58) Field of Classification Search
None
See application file for complete search history.

(56) References Cited

U.S. PATENT DOCUMENTS 7,124,022 B2 * 10/2006 Carmichael et al. ......... 701/409
2009/0141043 A1    6/2009 Guo et al.
2013/0128066 A1 *  5/2013 Jin et al. .................... 348/208.99
2014/0064636 A1 *  3/2014 Zhang et al. ................ 382/284
2014/0086494 A1 *  3/2014 Benhimane et al. ......... 382/215

FOREIGN PATENT DOCUMENTS

EP    1376467 A2    1/2004
WO   2008/076910 A1    6/2008

OTHER PUBLICATIONS

Szeliski, "Image Alignment and Stitching: A Tutorial", Foundations and Trends® in Computer Graphics and Vision, vol. 2, Issue 1, Jan. 2006, pp. 1-104.
Brown et al., "Automatic Panoramic Image Stitching Using Invariant Features", International Journal of Computer Vision, vol. 74, Issue 1, Aug. 2007, pp. 59-73.
Liu et al., "Real-time Warps for Improved Wide-angle Viewing", Technical Report, MSR-TR-2002-110, Nov. 2002, 19 pages.
Koo et al., "A New Method to Find an Optimal Warping Function in Image Stitching", IEEE International Conference on Acoustics, Speech and Signal Processing, Apr. 19-24, 2009, pp. 1289-1292.

* cited by examiner

*Primary Examiner* — Randolph I Chu
(74) *Attorney, Agent, or Firm* — Harrington & Smith

(57) ABSTRACT

In accordance with an example embodiment a method, apparatus and computer program product are provided. The method comprises extracting a set of image features from a first image and a corresponding set of image features from a second image. A first transformation matrix and a second transformation matrix are computed between the first image and the second image based on a matching of the set of image features in the first image with the corresponding set of image features in the second image. A first set of feature points is determined based on the first transformation matrix, and a second set of feature points based on the second transformation matrix. A transformation matrix is estimated between the first set of feature points and the second set of feature points. The second image is aligned with the first image based on the transformation matrix.

20 Claims, 7 Drawing Sheets

METHOD, APPARATUS AND COMPUTER PROGRAM PRODUCT FOR PROCESSING OF IMAGES

TECHNICAL FIELD

Various implementations relate generally to method, apparatus, and computer program product for processing of images.

BACKGROUND

The rapid advancement in technology related to capturing images has resulted in an exponential increase in the creation of image content. Devices like mobile phones and personal digital assistants (PDA) are now being increasingly configured with image capturing tools, such as a camera, thereby facilitating easy capture of the image content. The captured images may be subjected to processing based on various user needs. For example, images corresponding to a scene captured from various viewpoints and angles may have a high amount of overlapping image portions. Such images may be processed to generate a panorama image. A panorama image refers to an image with an extended field of view (for example, a wide-angle representation) beyond that can be captured by an image sensor. The processing of images may also help in retrieving relatively similar images or deleting duplicate images from a large collection of images and help streamline browsing and storing of the images.

SUMMARY OF SOME EMBODIMENTS

Various aspects of example embodiments are set out in the claims.

In a first aspect, there is provided a method comprising: extracting a set of image features from a first image and a corresponding set of image features from a second image; computing a first transformation matrix between the first image and the second image based on a matching of the set of image features in the first image with the corresponding set of image features in the second image; computing a second transformation matrix between the first image and the second image based on a matching of the set of image features in the first image with the corresponding set of image features in the second image; determining a first set of feature points based on the first transformation matrix, and a second set of feature points based on the second transformation matrix; estimating a transformation matrix between the first set of feature points and the second set of feature points; and aligning the second image with the first image based on the transformation matrix.

In a second aspect, there is provided an apparatus comprising at least one processor; and at least one memory comprising computer program code, the at least one memory and the computer program code configured to, with the at least one processor, cause the apparatus to at least perform: extract a set of image features from a first image and a corresponding set of image features from a second image; compute a first transformation matrix between the first image and the second image based on a matching of the set of image features in the first image with the corresponding set of image features in the second image; compute a second transformation matrix between the first image and the second image based on a matching of the set of image features in the first image with the corresponding set of image features in the second image; determine a first set of feature points based on the first transformation matrix, and a second set of feature points based on the second transformation matrix; estimate a transformation matrix between the first set of feature points and the second set of feature points; and aligning the second image with the first image based on the transformation matrix.

In a third aspect, there is provided a computer program product comprising at least one computer-readable storage medium, the computer-readable storage medium comprising a set of instructions, which, when executed by one or more processors, cause an apparatus to at least perform: extract a set of image features from a first image and a corresponding set of image features from a second image; compute a first transformation matrix between the first image and the second image based on a matching of the set of image features in the first image with the corresponding set of image features in the second image; compute a second transformation matrix between the first image and the second image based on a matching of the set of image features in the first image with the corresponding set of image features in the second image; determine a first set of feature points based on the first transformation matrix, and a second set of feature points based on the second transformation matrix; estimate a transformation matrix between the first set of feature points and the second set of feature points; and aligning the second image with the first image based on the transformation matrix.

In a fourth aspect, there is provided an apparatus comprising: means for extracting a set of image features from a first image and a corresponding set of image features from a second image; means for computing a first transformation matrix between the first image and the second image based on a matching of the set of image features in the first image with the corresponding set of image features in the second image; means for computing a second transformation matrix between the first image and the second image based on a matching of the set of image features in the first image with the corresponding set of image features in the second image; means for determining a first set of feature points based on the first transformation matrix, and a second set of feature points based on the second transformation matrix; means for estimating a transformation matrix between the first set of feature points and the second set of feature points; and means for aligning the second image with the first image based on the transformation matrix.

In a fifth aspect, there is provided a computer program comprising program instructions which when executed by an apparatus, cause the apparatus to: extract a set of image features from a first image and a corresponding set of image features from a second image; compute a first transformation matrix between the first image and the second image based on a matching of the set of image features in the first image with the corresponding set of image features in the second image; compute a second transformation matrix between the first image and the second image based on a matching of the set of image features in the first image with the corresponding set of image features in the second image; determine a first set of feature points based on the first transformation matrix, and a second set of feature points based on the second transformation matrix; estimate a transformation matrix between the first set of feature points and the second set of feature points; and aligning the second image with the first image based on the transformation matrix.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 7B of the drawings.

Figure 1:
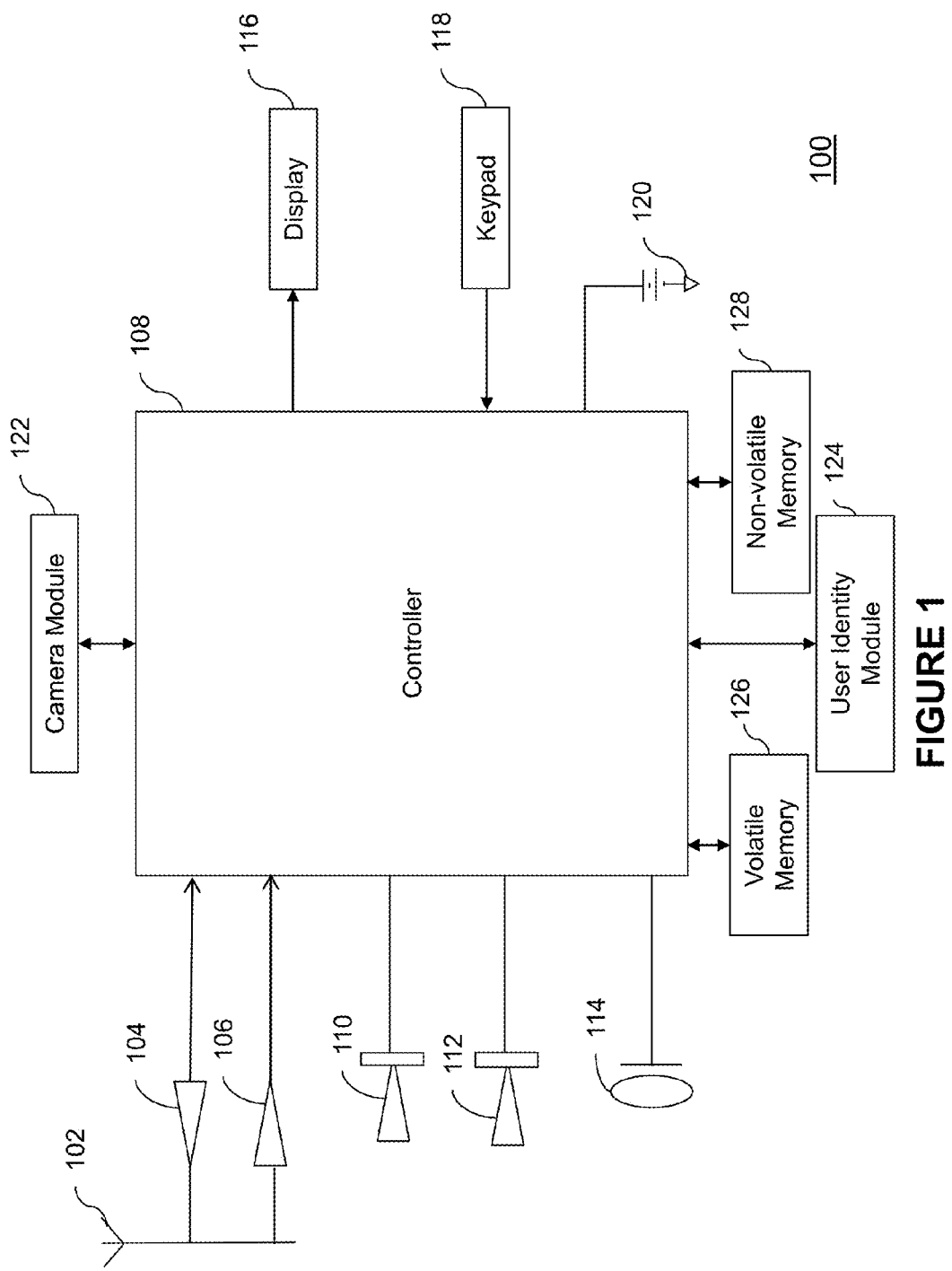
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment, the media capturing element is a camera module 122 which may include a digital camera capable of forming a digital image file from a captured image. As such, the camera module 122 includes all hardware, such as a lens or other optical component(s), and software for creating a digital image file from a captured image. Alternatively, or additionally, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. In an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
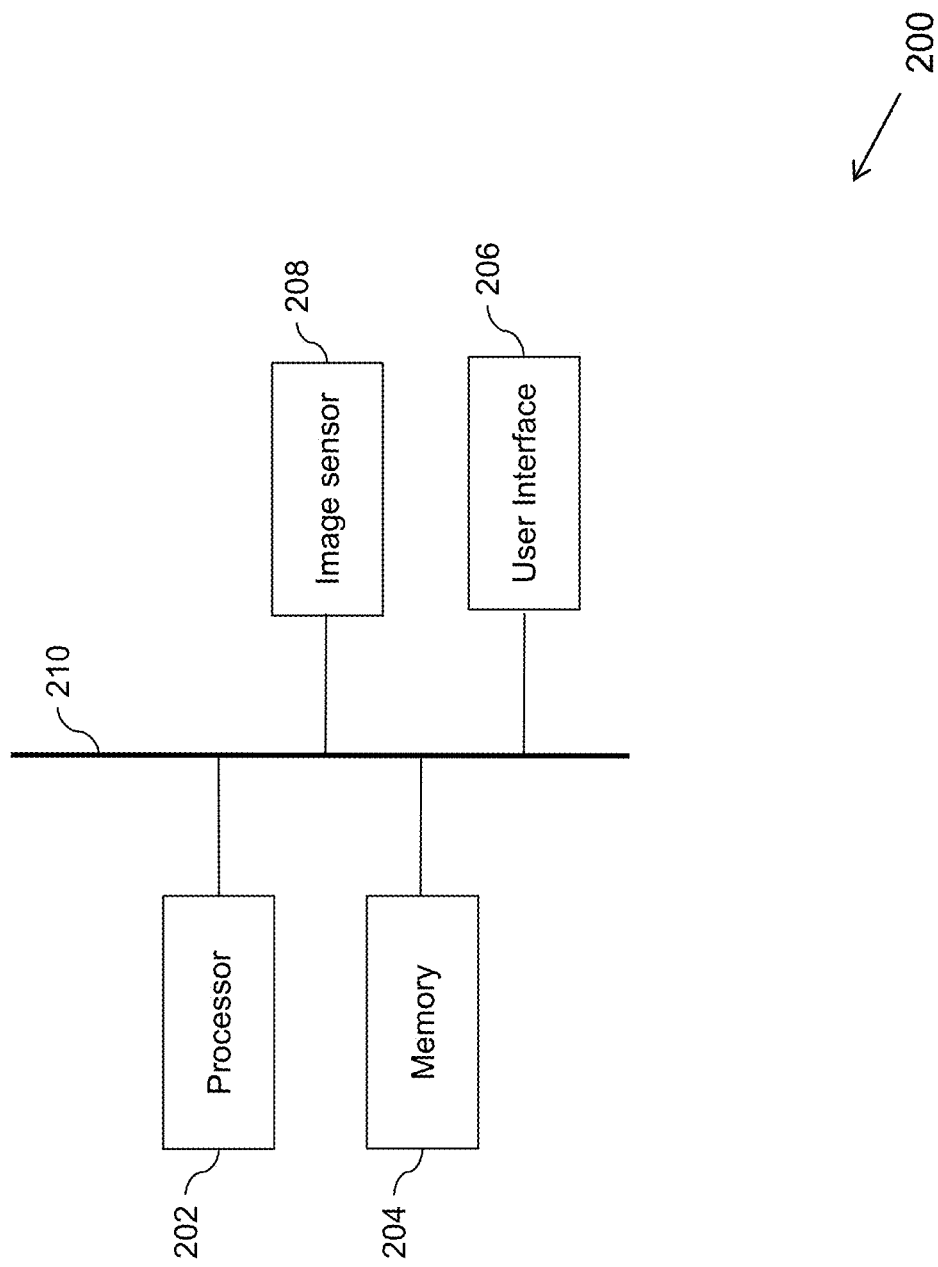
FIG. 2 illustrates an apparatus for processing of images in accordance with an example embodiment.

FIG. 2 illustrates an apparatus 200 for processing of images in accordance with an example embodiment. The apparatus 200 for processing of images may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, (for example, the device 100 or in a combination of devices). It should also be noted that the devices or elements described below may not be mandatory and thus some may be omitted in certain embodiments.

In an embodiment, the images may be captured by utilizing the camera module 122 of the device 100, and stored in the memory of the device 100. In an embodiment, the images may correspond to a same scene, or alternatively, the images may correspond to disparate scenes. The images may be stored in the internal memory such as hard drive, random access memory (RAM) of the apparatus 100 or in external storage medium such as digital versatile disk, compact disk, flash drive, memory card, or from external storage locations through Internet, Bluetooth®, and the like.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising multimedia content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with communication capabilities, computing devices, and the like. Some examples of the communication device may include a mobile phone, a personal digital assistant (PDA), and the like. Some examples of computing device may include a laptop, a personal computer, and the like. In an example embodiment, the electronic device may include a user interface, for example, the UI 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive images. In an embodiment, the images correspond to a scene.

In an example embodiment, the electronic device may be embodied as to include an image sensor, such as an image sensor 208. The image sensor 208 may be in communication with the processor 202 and/or other components of the apparatus 200. The image sensor 208 may be in communication with other imaging circuitries and/or software, and is configured to capture digital images or to make a video or other graphic media files. The image sensor 208 and other circuitries, in combination, may be an example of the camera module 122 of the device 100. In certain example embodiments, the image sensor 208 may be external to the apparatus 200, but accessible and/or controlled by the apparatus 200.

These components (202-208) may communicate with each other via a centralized circuit system 210 for capturing of image and/or video content. The centralized circuit system 210 may be various devices configured to, among other things, provide or enable communication between the components (202-208) of the apparatus 200. In certain embodiments, the centralized circuit system 210 may be a central printed circuit board (PCB) such as a motherboard, main board, system board, or logic board. The centralized circuit system 210 may also, or alternatively, include other printed circuit assemblies (PCAs) or communication channel media.

In an example embodiment, the processor 200 is configured to, with the content of the memory 204, and optionally with other components described herein, to cause the apparatus 200 to facilitate receipt of a plurality of images associated with a scene for processing of the plurality of images. In an embodiment, the processing of the plurality of images may be configured to generate a panorama image of a scene. As described herein, the term 'panorama image' refers to images associated with a wider or elongated field of view. A panorama image may include a two-dimensional construction of a three-dimensional scene. In some embodiments, the panorama image may provide about 360 degrees view of the scene. The panorama image may be generated by capturing a video footage or multiple still images of the scene, as a multimedia capturing device (for example, a camera) is spanned through a range of angles.

In some embodiments, the generation of a panorama image involves various processes, for example, image acquisition, image registration and image merging/blending. In some embodiments, the image acquisition may be performed by an image capturing device, for example, a camera. In an embodiment, during image acquisition, the multimedia content associated with the scene may be captured by displacing the apparatus 200 in at least one direction. In an example embodiment, the camera may be moved around the scene either from left direction to right direction, or from right direction to left direction, or from top direction to a bottom direction, or from bottom direction to top direction, and so on. In an embodiment, the apparatus 200 may be an example of a media capturing device, for example, a camera. In some embodiments, the apparatus 200 may include a position sensor for determining direction of movement of the apparatus 200 for capturing the multimedia content. In some embodiments, the multimedia content may comprise images of one or more objects captured at different times. In certain other embodiments, the multimedia content may comprise a video content, such as a short movie, recording of an event or movie, and the like.

In various example embodiments, the scene may include one or more objects, which may be captured by the image sensors, such as the image sensor 208. In an example embodiment, the apparatus 200 is caused to facilitate the receipt of the plurality of images and the image data by capturing the plurality of images and plurality of image data by one or more image sensors such as the image sensor 208. It is noted that each image may correspond to at least a portion of the scene such that the images, for example, the first image and the second image of the plurality of images may be used to generate the panorama image of the scene.

In an embodiment, the plurality of images may include, for example, a first image and a second image associated with the scene such that the first image and the second image includes at least an overlapping region between them. In various example embodiments, the first image may be any selected image such as $i^{th}$ image ($X_i$) of the multimedia content, where 'i' may be any number from one to number of images in the multimedia content. In an embodiment, the first image ($X_1$) of the multimedia content may be selected as the base image, and the remaining images $X_2$, $X_3$ . . . $X_n$ are aligned to the image $X_1$. In an embodiment, an initial image (for example, the image with the earliest timestamp) from among the captured images may be dynamically chosen as the first image. In an example embodiment, the first image may be adjacent to the second image. In an embodiment, a first image may be selected from among a collection of images either automatically or manually by user selection. In an embodiment, a user may provide a selection of the first image from among a collection of images, for example by using the user interface 206. In an embodiment, the first image may be received from an internal memory such as hard drive, random access memory (RAM) of the apparatus 200 or from an external storage medium such as digital versatile disk, compact disk, flash drive, memory card, or from external storage locations through Internet, Bluetooth®, and the like. The first image may also be received from the memory 204. In an example embodiment, a processing means may be configured to facilitate receipt of the first image. An example of the processing means may include the processor 202, which may be an example of the controller 108.

In an example embodiment, the processor 202 is configured to, with the content of the memory 204, and optionally with other components described herein, to cause the apparatus 200 to extract a set of image features from the first image and a corresponding set of image features from the second image. In an embodiment, the term 'image features' refers to an information associated with an image. In an example embodiment, the image features may be related to motion in the sequence of images, shapes such as curves, boundaries, corners, and the like. In an embodiment, the feature points of the first plurality of feature points and the second plurality of feature points comprises at least one of inliers and corner points. Examples of the image features in a may include, but are not limited to, corners, edges of one or more objects in the image, or other region of interest such as background or foreground in the image. The feature extraction of the plurality of image, for example, the first image and the second image may be performed using algorithms such as Harris corner detector, smallest univalue segment assimilating nucleus (SUSAN) corner detector, features from accelerated segment test (FAST). Alternatively, extracting the features may be performed by applying one of DCT, DST, KLT transform and a Hadamard transform on macroblocks corresponding to the first image and the second image.

In an embodiment, the image features associated with the first image and the second image may be extracted based on a corner detection method. In an embodiment, the corner detection method includes extraction of features associated with the first image and the second image, and inferring contents of the images based on the extracted image features. In an embodiment, the term 'corner' may be defined as an intersection of two edges that may define the boundary between two different objects or the parts of a same object, for example, in an image. In an example embodiment, the corner detection method may include Harris corners method for computing corners. In this embodiment, the image features associated with the first image and the second image may be Harris corner features that may be computed and arranged in a collection of local feature vectors associated with the first image and the second image, respectively. Each of the feature vectors may be distinctive and invariant to any scaling, rotation and translation of the image. The feature vectors may be utilized for determining distinctive objects in different frames, associated with the first image and the second image. In an example embodiment, a processing means may be configured to extract the set of image features from the first image and a corresponding set of image features from the second image. An example of the processing means may include the processor 202, which may be an example of the controller 108. In an example representation, the set of feature points in the first image $X_1$ may be represented as $PX_1(x_i, y_i)$, where 'i' can be any integer value.

In an embodiment, the set of image features in the adjacent images may be matched. For example, the set of image features in the first image is matched with the corresponding set of image features in the second image. In an embodiment, 'corresponding set of image features' may be features in the second image that are similar to the features present in the first image. For example, the features such as corners, edges of one or more objects in the second image, or other region of interest such as background or foreground in the second image may be referred to as corresponding set of image features on a determination of similar corners, edges of one or more objects, or other region of interest such as background or foreground, respectively being present in the first image.

In an example embodiment, the apparatus 200 is caused to perform matching of the set of image features in the second image $X_2$ corresponding to the set of image features in the first image. In an example embodiment, the image features may be represented by feature points. In an embodiment, the set of feature points ($PX_2$(xi, yi)) in the second image $X_2$ may be matched with the corresponding set of image feature points ($PX_1(x_i, y_i)$) in the first image $X_1$. In this embodiment, 'matching of the set of image features' may mean, performing a maximum cross-correlation match in a window around the corresponding feature points in the images. For example, the matching feature points ($PX_2$(xi, yi)) may be determined by performing the maximum cross-correlation match in a window around the feature points ($PX_1$(xi, yi)) in the second image $X_2$. In an embodiment, on performing the maximum cross-correlation matching, unreliable matches may be identified based on a threshold value, and may be discarded. In an embodiment, based on the matching of the set of image features with the corresponding set of image features, a set of matching image features may be determined.

In an example embodiment, the processor 202 is configured to, with the content of the memory 204, and optionally with other components described herein, to cause the apparatus 200 to compute a first transformation matrix between the first image and the second image based on the matching of the set of image features in the first image with the corresponding set of image features in the second image. In an example embodiment, the apparatus 200 is caused to determine the first transformation matrix between the set of matched feature points, for example, the feature points ($PX_1(x_i, y_i)$ and ($PX_2(x_i, y_i)$)). In an example embodiment, the first transformation matrix between the feature points ($PX_1(x_i, y_i)$) and ($PX_2(x_i, y_i)$)) may be obtained using scheme including, but not limited to, random sample consensus (RANSAC) method/technique.

In an embodiment, the RANSAC method may be utilized for computing the values of the parameters of the first transformation matrix between the matched locations on the first image and the second image that may satisfy a minimum distance criterion. For example, for a given transformation matrix, a feature point in the first image $X_1$ is considered an inlier based on a comparison of an euclidean distance between the feature point in the first image $X_1$ and a corresponding transformed point in a transformed frame of the second image $X_2$ and an error tolerance value. For example, if a transformation matrix between images $X_1$ and $X_2$ is represented as $T_{K1,K2}$, for a point (for example, $PX_1(x_i, y_i)$) in the first image $X_1$, the corresponding transformed point in the second image $X_2$ may be $PX_2'(x_1,y_1)$ that can be obtained by multiplying the transformation matrix and the feature point in the image $X_1$ (for example, $PX_2'(x_1,y_1)=T_{K1,K2}*PX_1(x_1,y_1)$). In an example embodiment, a feature point such as the point $PX_2'(x_1,y_1)$ is considered as an inlier if the euclidean distance between the point $PX_1(x_1,y_1)$ and the transformed point $PX_2'(x_1,y_1)$ is less than or equal to the error tolerance value. In an embodiment, the process of considering matching feature points in the first image and the second image for computing the values of the parameters of the first transformation matrix, and then determining the number of remaining points that may satisfy these values of the parameters, may be repeated until a final value of the parameters are determined that gives a maximum number of inliers for a predetermined number of iterations.

In an example embodiment, the processor 202 is configured to, with the content of the memory 204, and optionally with other components described herein, to cause the apparatus 200 to compute a second transformation matrix between the first image and the second image based on the matching of the set of image features in the first image with the corresponding set of image features in the second image. In an embodiment, the second transformation matrix may be determined based on the set of the matching image features generated based on the matching of set of image features and the corresponding set of image features. In an embodiment, the second transformation matrix includes a similarity transformation matrix. In an embodiment, similarity transformation may refer to a geometric similarity, or to a matrix transformation that results in a similarity. Similarity transformations are configured to transform objects in space to similar objects.

In an example embodiment, the processor 202 is configured to, with the content of the memory 204, and optionally with other components described herein, to cause the apparatus 200 to determine a first set of feature points based on the first transformation matrix, and a second set of feature points based on the second transformation matrix. In an example embodiment, the processor 202 is configured to, with the content of the memory 204, and optionally with other components described herein, to cause the apparatus 200 to estimate a transformation matrix between the first set of feature points and the second set of feature points. In an embodiment, the set of first feature points associated with the first transformation matrix (H) may be multiplied with the computed transformation matrix (T) for aligning the second image with the first image. In an embodiment, the alignment of the second image with the first image may be utilized for generating a panorama image of the first image and the second image. In an example embodiment, the processor 202 is configured to, with the content of the memory 204, and optionally with other components described herein, to cause the apparatus 200 to align the second image with the first image based on the transformation matrix.

In an example embodiment, the apparatus 200 is caused to generate a transformed or a warped image ($WX_2$) of the second image $X_2$ corresponding to the first image $X_1$ based on the transformation matrix ($T_{K1,K2}$) between the second image $X_2$ and the first image $X_1$, and align the warped image with the first image. It should be noted that the warped image ($WX_2$) of the second image $X_2$ is aligned to the first image $X_1$. In an example embodiment, the apparatus 200 is caused to store the warped image ($W_{K2}$) storage location such as an image buffer that can be present in the memory 204, or in any other location embodied in the apparatus 200 or otherwise accessible to the apparatus 200.

In an example embodiment, the apparatus 200 is caused to align the subsequent images (for example, $X_3$, $X_4$ . . . $X_n$, where n>2 and is an integer) to the first image $X_1$ by matching a set of feature points in the subsequent images with a set of feature points in a warped or transformed images. In an example embodiment, for a subsequent image, the apparatus 200 is caused to determine a modified subsequent image based on the first image and a warped image of the preceding images. For instance, for aligning the images $X_3$, the modified image ($X_{mod}$) may be determined based on the image $X_1$ and the warped images of the preceding images, such as images $X_2$ and $X_3$.

In an embodiment, the first transformation matrix (H) may facilitate in generating a first pre-processed image. In an embodiment, the first pre-processed image may be a panorama image generated from the first image and the second image by utilizing the first transformation matrix. In an embodiment, the second transformation matrix may facilitate in generating a second pre-processed image. In an embodiment, the second pre-processed image may be a panorama image generated from the first image and the second image by utilizing the second transformation matrix. An example of the first pre-processed image and an example second pre-processed image are illustrated and explained in detail in FIGS. 4A and 4B, respectively. It will be understood that for the description of the present embodiment, the plurality of images is assumed to include the first image and the second image. It will however, be understood that the plurality of images may include more than two images. For example, the plurality of images may include at least one subsequent image to the second image.

In the embodiment, wherein the plurality of images includes at least one subsequent image to the second image, a first transformation matrix and a second transformation matrix may be determined between each of the adjacent images. In this embodiment, the first transformation matrix and the second transformation matrix may be construed as to include a set of first transformation matrices and a set of second transformation matrices, respectively. The set of first transformation matrices comprises transformation matrices between each of the adjacent images, such as images $X_1$, $X_2$, $X_3$ . . . $X_n$. In an embodiment, the set of first transformation matrices may include a set of homography transformation matrices. In an embodiment, the set of homography transformation matrices may be represented as:

$$H=\{H_1, H_2, \ldots, H_N\}$$

wherein, $H_1$ is the homographic matrix between the input images $X_1$ and $X_2$, $H_2$ is the homographic transformation matrix between the input images $X_2$ and $X_3$, and so on.

In an embodiment, the homographic transformation matrix between an input image $X_{n-1}$ and a subsequent image $X_n$ may be determined as follows:

$$H_n = H_{n-1} * H_n'$$

In an embodiment, the set of second transformation matrices may include a set of similarity transformation matrices. In an embodiment, the set of similarity transformation matrices comprises matrices between each of the adjacent images, such as images $X_1$, $X_2$, $X_3$ . . . $X_n$. In an embodiment, the set of similarity transformation matrices may be represented as:

$$S=\{S_1, S_2, \ldots, S_N\}$$

wherein, $S_1$ is the similarity matrix between the input images $X_1$ and $X_2$, $S_2$ is the similarity matrix between the input images $X_2$ and $X_3$, and so on.

In an embodiment, the similarity transformation matrix between an input image $X_{n-1}$ and a subsequent image $X_n$ may be determined as follows:

$$S_n = S_{n-1} * S_n'$$

In an embodiment, the processor 202 is configured to, with the content of the memory 204, and optionally with other components described herein, to cause the apparatus 200 to generate the first pre-processed image based on the set of first transformation matrices, H, such that the first set of feature points is determined by determining feature points in the first pre-processed image. In an embodiment, the second pre-processed image is generated based on the set of second transformation matrices, S, such that the second set of feature points is determined by determining feature points in the second pre-processed image.

In an example embodiment, a transformation matrix is estimated between the first set of feature points and the second set of feature points determined from the first transformation matrix and the second transformation matrix, respectively. In an embodiment, feature matching is performed between the first set of feature points and the second set of feature points, and the transformation matrix is computed based on the feature matching. In an example embodiment, the transformation matrix between the first set of feature points and the second set of feature points may be obtained using scheme including, but not limited to, RANSAC algorithm.

In an example embodiment, the processor 202 is configured to, with the content of the memory 204, and optionally with other components described herein, to cause the apparatus 200 to compute a mismatch error associated with the computed transformation matrix. In an embodiment, the mismatch error is compared with a predetermined threshold value of the mismatch error. In an embodiment, based on a determination of the value of mismatch error being greater than the predetermined threshold value, the computed transformation matrix is modified, and the mismatch error is computed again until the value of the mismatch error is determined to be less than the predetermined threshold value of mismatch error. In an embodiment, for computing the modified transformation matrix, the image features considered for matching in the first set of features and the second set of features may be replaced with alternative image features, and the modified transformation matrix may be computed.

In an example embodiment, the computed transformation matrix (T) may be utilized for generating a panorama image. For example, the transformation matrix (T) may be applied to the first pre-processed image. In an embodiment, the panorama image being generated may be devoid of stretching errors and mismatch errors.

In an example embodiment, a processing means may be configured to: extract a set of image features from a first image and a corresponding set of image features from a second image, the first image and the second image being adjacent images; compute a first transformation matrix between the first image and the second image based on a matching of the set of image features in the first image with the corresponding set of image features in the second image; compute a second transformation matrix between the first image and the second image based on a matching of the set of image features in the first image with the corresponding set of image features in the second image; determine a first set of feature points based on the first transformation matrix, and a second set of feature points based on the second transformation matrix; estimate a transformation matrix between the first set of feature points and the second set of feature points; and align the second image with the first image based on the transformation matrix. An example of the processing means may include the processor 202, which may be an example of the controller 108.

Figure 3:
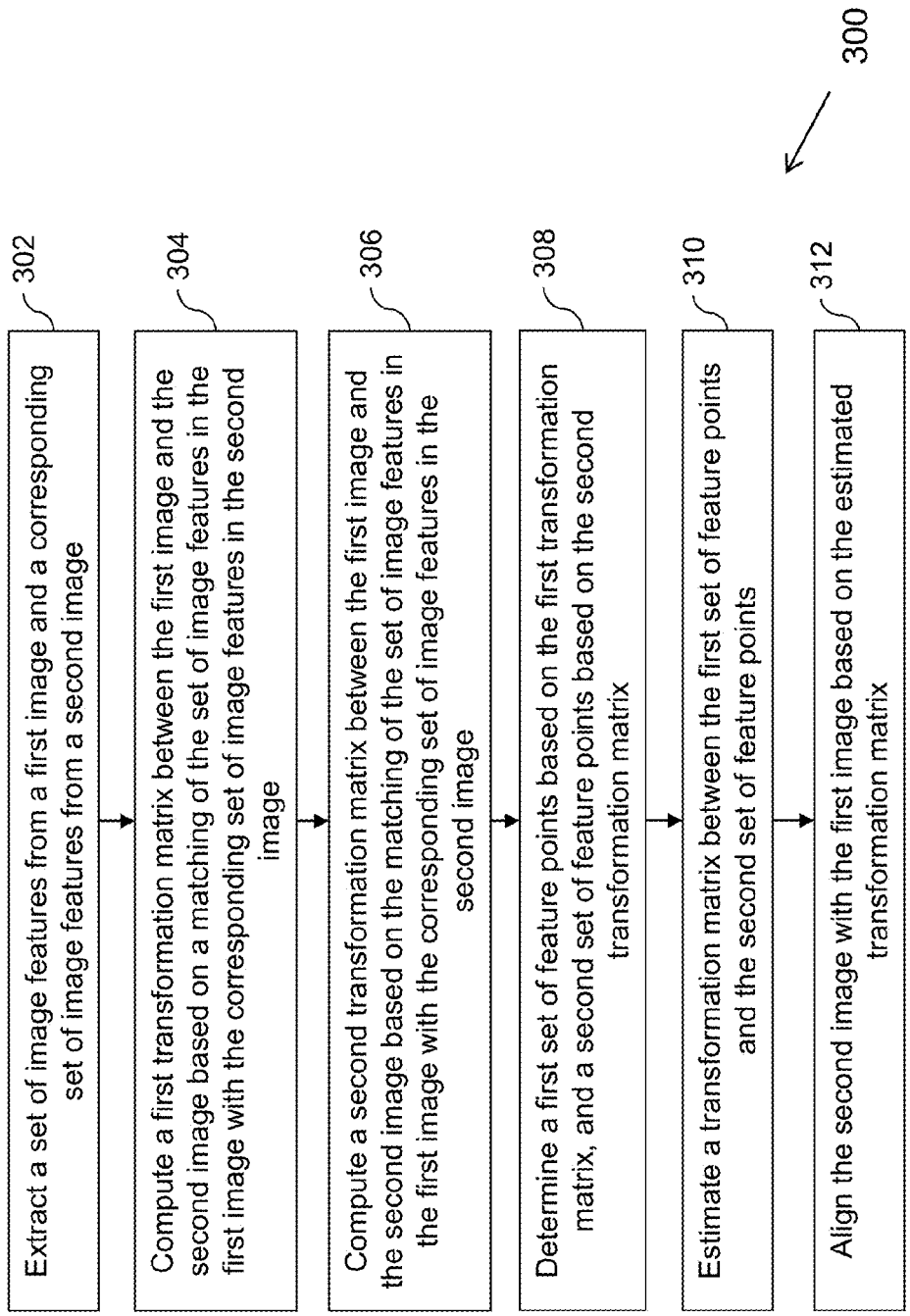
FIG. 3 is a flowchart depicting an example method for processing of images in accordance with an example embodiment.
Figure 4A:
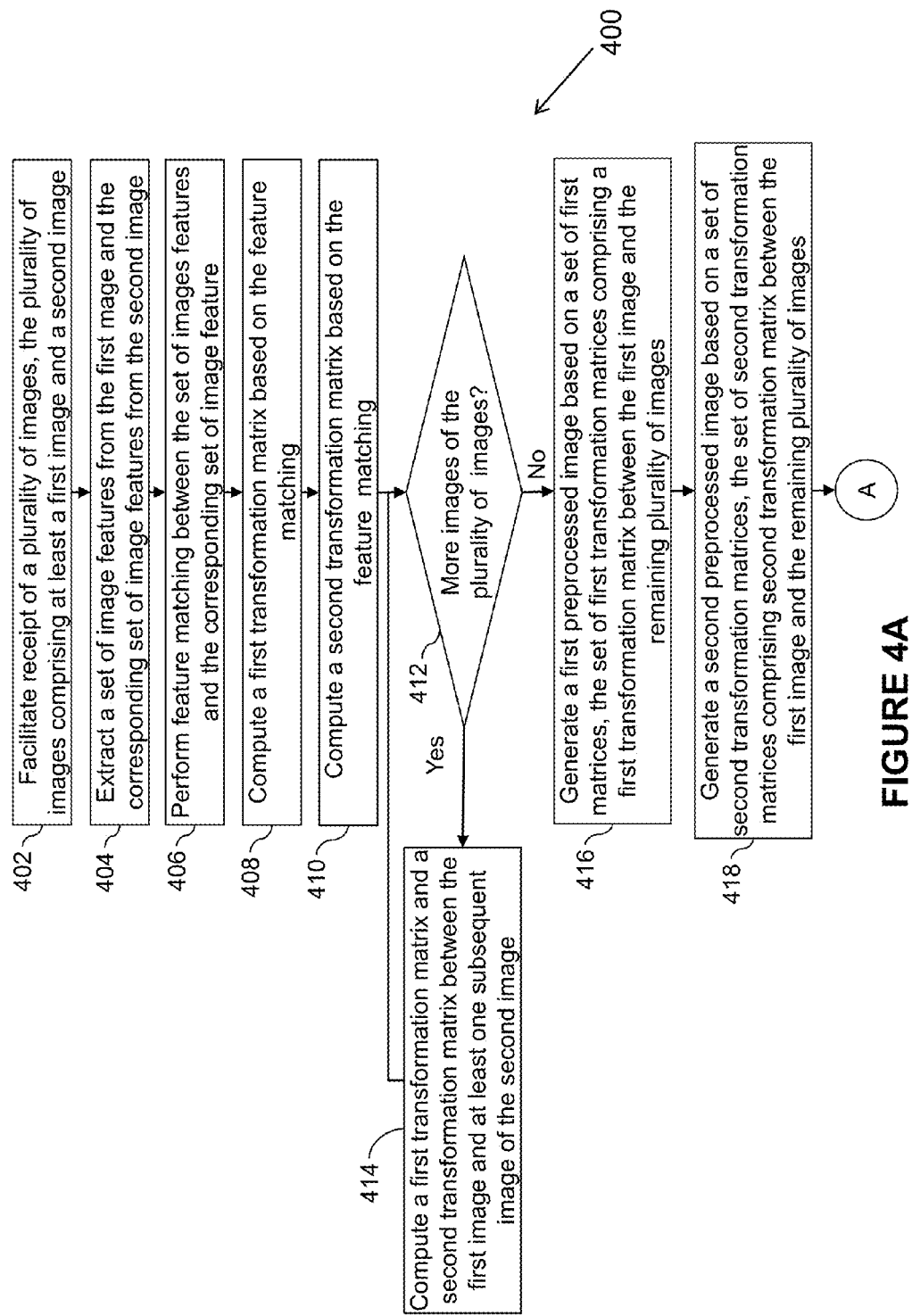
FIGS. 4A and 4B illustrate a flowchart depicting an example method for processing of images in accordance with another example embodiment.
Figure 4B:
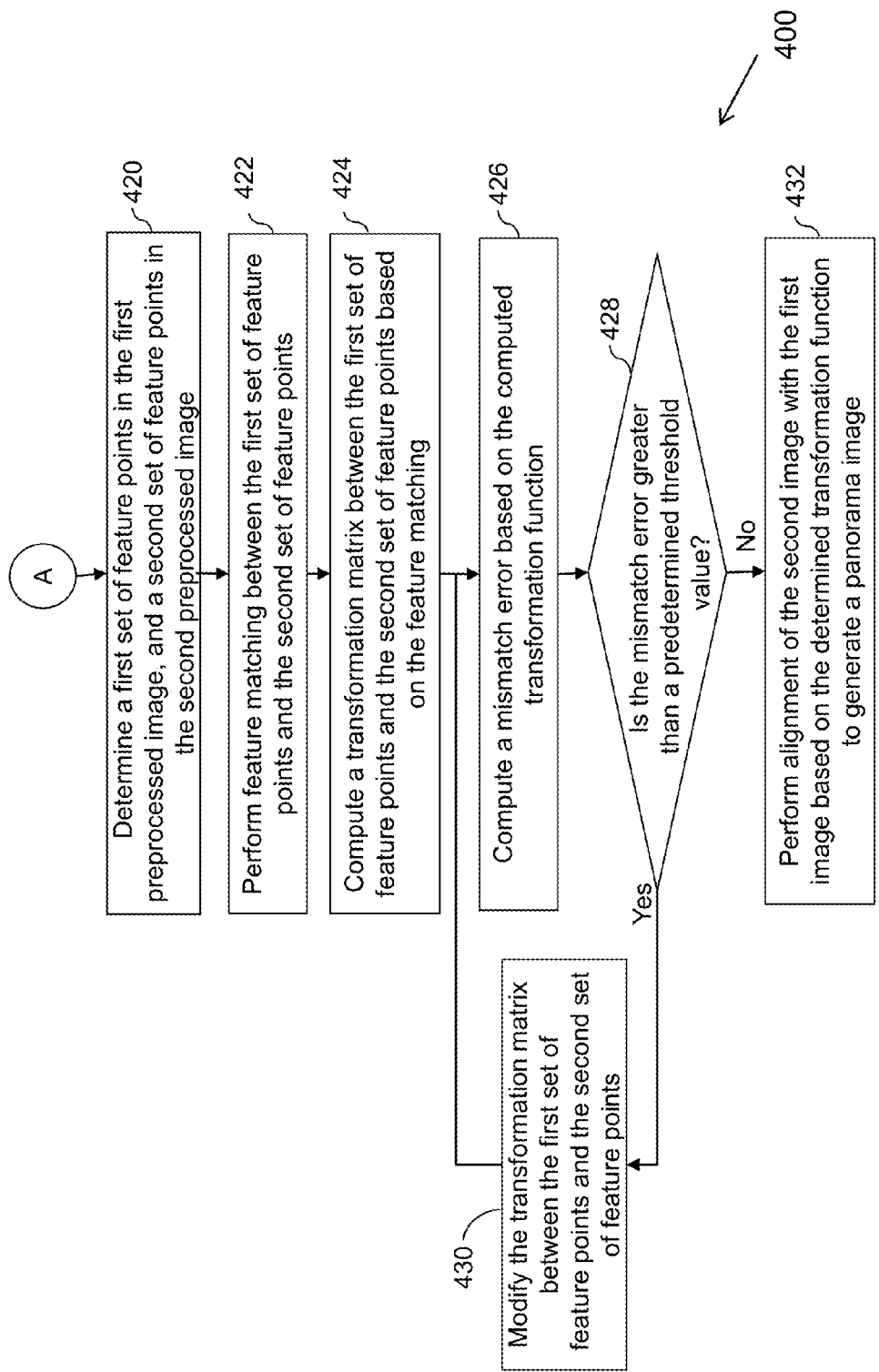

FIG. 3 is a flowchart depicting an example method 300 for processing images, in accordance with an example embodiment. The method 300 depicted in the flow chart may be executed by, for example, the apparatus 200 of FIG. 2. In some embodiments, the processed image may be combined for generating a panorama image. In some embodiment, the processed images may be combined for applications such as object recognition, image retrieval, and the like. In some embodiments, the plurality of images may be captured by an image capturing device, or may be retrieved from a memory of a device, for example, the device 100 (refer to FIG. 1).

In an example embodiment, the plurality of images may be associated with a scene, such that each of the plurality of images may correspond to at least a portion of the scene. As disclosed herein, the plurality of images may include adjacent images such that any two adjacent images of the plurality of images may include a common portion or an overlapping region. For example, the plurality of images may include a first image and a second image having an overlapping region between them. As disclosed herein, the terms 'first image' and 'second image' refers to successive (or adjacent) images associated with a scene, such that the first image and the second image comprises at least an overlapping region. An example illustrating the first image and the second image is illustrated and described in detail with reference to FIGS. 5A-5C. It is noted that in various embodiments, the second image may succeed the first image, and vice-versa. Also, it will be contemplated that for the generation of the panorama image, the plurality of images may be input, and each image of the plurality of images may be stitched with at least one of a succeeding image and a preceding image by utilizing the method disclosed herein.

In some embodiments, the plurality of images, for example the first image and the second image may include image features. At block 302, the method 300 includes extracting a set of image features from the first image and a corresponding set of image features from the second image. In an example embodiment, the image features may be related to shapes such as curves, boundaries, corners, edges of one or more objects in the image, or other region of interest such as background or foreground in the image, and the like in the plurality of images. In an embodiment, the feature points of the first plurality of feature points and the second plurality of feature points comprises at least one of inliers and corner points. In an embodiment, 'corresponding set of image features' may be features in the second image that are similar to the features present in the first image. For example, the features such as corners, edges of one or more objects in the second image, or other region of interest such as background or foreground in the second image may be referred to as corresponding set of image features when similar corners, edges of one or more objects, or other region of interest such as background or foreground are present in the first image. In an embodiment, the image features associated with the first image and the second image may be determined based on a corner detection method.

In an embodiment, the set of image features in the adjacent images may be matched. For example, the set of image features in the first image is matched with the corresponding set of image features in the second image. In an embodiment, a set of image feature points ($PX_2(xi, yi)$) in the second image $X_2$ may be matched with the corresponding set of image feature points ($PX_1(x_i, y_i)$) in the first image $X_1$. In this embodiment, 'matching of the set of image features' may mean, performing a maximum cross-correlation match in a window around the corresponding feature points in the images. In an embodiment, on performing the maximum cross-correlation matching, unreliable matches may be identified based on a threshold value, and may be discarded. In an embodiment, a set of matching image features is determined between the set of image features from the first image and the corresponding set of image features from the second image.

At block 304, a first transformation matrix is computed between the first image and the second image based on the matching of the set of image features in the first image with the corresponding set of image features in the second image. In an embodiment, the first transformation matrix may be determined based on the set of matching image features. In an example embodiment, the first transformation matrix between the feature points ($PX_1(x_i, y_i)$ and ($PX_2(x_i, y_i)$)) may be obtained using scheme including, but not limited to, RANSAC method/technique. In an embodiment, the RANSAC method may be utilized for computing the values of the parameters of the first transformation matrix between the matched locations on the first image and the second image that may satisfy a minimum distance criterion. In an embodiment, the process of considering matching feature points in the first image and the second image for computing the values of the parameters of the first transformation matrix, and then determining the number of remaining points that may satisfy these values of the parameters, may be repeated until a final value of the parameters are determined that gives a maximum number of inliers for a predetermined number of iterations. In an embodiment, the first transformation matrix includes a homography transformation matrix.

At block 306, a second transformation matrix is computed between the first image and the second image based on the matching of the set of image features in the first image with the corresponding set of image features in the second image. In an embodiment, the first transformation matrix may be determined based on the set of matching image features. In an embodiment, the second transformation matrix includes a similarity transformation matrix. In an embodiment, the 'similarity transformation' may refer to a geometric similarity, or to a matrix transformation that results in a similarity. Similarity transformation may transform objects in space to similar objects.

At block 308, a first set of feature points is determined based on the first transformation matrix, and a second set of feature points is determined based on the second transformation matrix. At block 310, a transformation matrix is estimated between the first set of feature points and the second set of feature points. In an embodiment, the set of first feature points associated with the first transformation matrix (H) may be multiplied with the computed transformation matrix (T) for aligning the second image with the first image. At block 312, the second image may be aligned with the first image based on the estimated transformation matrix. In an embodiment, the alignment of the second image with the first image may be utilized for generating a panorama image of the first image and the second image. In an embodiment, the panorama image being generated may be devoid of stretching errors and mismatch errors.

As disclosed herein with reference to FIG. 3, the method for processing the images is explained by utilizing two images, for example, the first image and the second image. However, it will be contemplated that the method 300 may be utilized for processing a plurality of images, without limiting the above description. For example, for more than two images, each image may be stitched with a successive image or a preceding image by utilizing the method 300. Moreover, for the plurality of images, the first transformation matrix and the second transformation matrix may refer to a set of first transformation matrices and a set of second transformation matrices. The set of first transformation matrices may include the first transformation matrix between adjacent images of the first image, the second image and the at least one subsequent image. The set of second transformation matrices comprises the second transformation matrix between the adjacent images of the first image, the second image and the at least one subsequent image.

In an example embodiment, a processing means may be configured to perform some or all of: extract a set of image features from a first image and a corresponding set of image features from a second image; compute a first transformation matrix between the first image and the second image based on a matching of the set of image features in the first image with the corresponding set of image features in the second image; compute a second transformation matrix between the first image and the second image based on a matching of the set of image features in the first image with the corresponding set of image features in the second image; determine a first set of feature points based on the first transformation matrix, and a second set of feature points based on the second transformation matrix; and estimate a transformation matrix between the first set of feature points and the second set of feature points; and align the second image with the first image based on the transformation matrix.

FIG. 4 is a flowchart depicting an example method 400 for processing of images in accordance with an example embodiment. The method 400 depicted in flow chart may be executed by, for example, the apparatus 200 of FIG. 2. Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 400 are described with help of apparatus 200 of FIG. 2. However, the operations of the method can be described and/or practiced by using any other apparatus.

At block 402 of method 400, receipt of a plurality of images, for example a first image and a second image is facilitated. In an embodiment, the first image and the second image are the adjacent images. In an embodiment, the first image and the second image may be an image captured corresponding to a scene by a media capture element, such as a camera module 122 of device 100 or the image sensor 208. The scene may include one or more objects in a surrounding environment of the media capture element, for example, a person or a gathering of individuals, birds, books, a playground, natural scenery, such as a mountain, and the like. In an embodiment, multiple images corresponding to a scene may be captured by an image sensor. An initial image (for example, the image with the earliest timestamp) from among the captured images may be dynamically chosen as the first image. In an embodiment, the first image may be selected from among a collection of images either automatically or manually by user selection. In an embodiment, a user may provide a selection of the first image from among a collection of images, for example by using a user interface, such as the user interface 206. In an embodiment, the first image may be received from an internal memory such as hard drive, random access memory (RAM) or from an external storage medium such as digital versatile disk, compact disk, flash drive, memory card, or from external storage locations through Internet, Bluetooth®, and the like.

At block 404, a set of image features from the first mage and the corresponding set of image features from the second image are extracted. In an example embodiment, the image features may be related to the shapes such as curves, boundaries, corners, and the like of the sequence of images. In an embodiment, feature points associated with the set of image features and the corresponding set of image features comprises at least one of inliers and corner points. Examples of the image features in an image may include, but are not limited to, corners, edges of one or more objects in the image, or other region of interest such as background or foreground in the image. The feature extraction of the plurality of images, for example, the first image and the second image may be performed using algorithms such as SIFT, Harris corner detector, SUSAN corner detector, FAST, and the like. Alternatively, extracting the features may be performed by applying one of DCT, DST, KLT transform and a Hadamard transform on macroblocks corresponding to the first image and the second image.

At block 406, a feature matching is performed between the set of image features and the corresponding set of image feature. For example, the set of image features in the first image is matched with the corresponding set of image features in the second image. In an example embodiment, the apparatus 200 is caused to perform matching of the set of image features in the second image $X_2$ corresponding to the set of image feature in the first image. In an example embodiment, the image features may be represented by feature points. In an embodiment, the set of image feature points $(PX_2(xi, yi))$ in the second image $X_2$ may be matched with the corresponding set of image feature points $(PX_1(x_i, y_i))$ in the first image $X_1$.

At block 408, a first matrix is computed based on the feature matching. In an example embodiment, the first transformation matrix between the feature points $(PX_1(x_i, y_i))$ and $(PX_2(x_i, y_i))$ may be obtained using scheme including, but not limited to, RANSAC method/technique. In an embodiment, the RANSAC method may be utilized for computing the values of the parameters of the first transformation matrix between the matched locations on the first image and the second image that may satisfy a minimum distance criterion. For example, for a given transformation matrix, a feature point in the first image $X_1$ is considered an inlier based on a comparison of an euclidean distance between the feature point in the frame $X_1$ and a corresponding transformed point in a transformed frame of the second frame $X_2$ and an error tolerance value.

In an embodiment, the process of considering matching feature points in the first image and the second image for computing the values of the parameters of the first transformation matrix, and then determining the number of remaining points that may satisfy these values of the parameters, may be repeated until a final value of the parameters are determined that gives a maximum number of inliers for a predetermined number of iterations.

At block 410, a second transformation matrix is computed between the first image and the second image based on matching of the set of image features in the first image with the corresponding set of image features in the second image. At block 412, it is determined whether more images of the plurality of images are remaining. If it is determined, that the number of images of the plurality of images are remaining, then at block 414, a first transformation matrix and a second transformation matrix between the first image and at least one subsequent image of the second image may be computed. In an embodiment, the first transformation matrix and the second transformation matrix may be computed between each of the adjacent images of the plurality of images to generate a set of first transformation matrices, H and a set of second transformation matrices, S. In an embodiment, the set of first transformation matrices and the set of similarity transformation matrices may include a set of homography transformation matrices and a set of similarity transformation matrices, respectively. In an embodiment, the set of homography transformation matrices and the set of similarity transformation matrices may be represented as:

$$H=\{H_1, H_2, \ldots, H_N\}$$

$$S=\{S_1, S_2, \ldots, S_N\}$$

wherein, $H_1$ and $S_1$ are the homography transformation matrix and the similarity transformation matrix between the input images $X_1$ and $X_2$, and wherein $$H_n = H_{n-1} * H_n'$$

$$S_n = S_{n-1} * S_n'$$

At block 416, a first preprocessed image is generated based on a set of first matrices. In an embodiment, the first preprocessed image is a panorama image being generated based on the set of first matrices. At block 418, a second preprocessed image is generated based on the set of second transformation matrices. In an embodiment, the second pre-processed image is a panorama image being generated based on the set of second transformation matrices. At block 420, a first set of feature points is determined by determining feature points in the first pre-processed image, and a second set of feature points is determined by determining feature points in the second pre-processed image.

At block 422, a feature matching is performed between the first set of feature points and the second set of feature points. In an embodiment, the feature matching is performed between the first set of feature points and the second set of feature points. At block 424, a transformation matrix is computed between the first set of feature points and the second set of feature points based on the feature matching. In an example embodiment, the transformation matrix between the first set of feature points and the second set of feature points may be obtained using scheme including, but not limited to, RANSAC algorithm.

At block 426, a mismatch error between the first set of feature points and the second set of image features is computed based on the computed transformation matrix. At block 428, it is determined whether the mismatch error is greater than a predetermined threshold value of mismatch error. In an embodiment, based on a determination of the value of mismatch error being greater than the predetermined threshold value, the computed transformation matrix is modified at block 430, and the mismatch error is computed again until the value of the mismatch error is determined to be less than the predetermined threshold value of mismatch error. In an embodiment, for computing the modified transformation matrix, the features considered for matching in the first set of features and the second set of features may be changed, and the modified transformation matrix may be computed.

At block 432, an alignment of the second image with the first image is performed based on the determined transformation matrix. An aligned or a warped image ($WX_2$) of the second image $X_2$ corresponding to the first image $X_1$ is generated based on the transformation matrix ($T_{K2, K1}$) between the second image $X_2$ and the first image $X_1$. It should be noted that the warped image ($WX_2$) of the second image $X_2$ is aligned to the first image $X_1$. In an example embodiment, the apparatus 200 is caused to align the subsequent images (for example, $X_3$, $X_4$ ... $X_n$, where n>2 and is an integer) to the first image $X_1$ by matching a set of feature points in the subsequent images with a set of feature points in a warped or transformed images. In an example embodiment, the computed transformation matrix (T) may be utilized for generating a panorama image. For example, the transformation matrix (T) may be applied to the first pre-processed image. In an embodiment, the panorama image being generated may be devoid of stretching errors and mismatch errors To facilitate discussion of the methods 300 and/or 400 of FIGS. 3 and 4, certain operations are described herein as constituting distinct steps performed in a certain order. Such implementations are exemplary and non-limiting. Certain operation may be grouped together and performed in a single operation, and certain operations can be performed in an order that differs from the order employed in the examples set forth herein. Moreover, certain operations of the methods 300 and/or 400 are performed in an automated fashion. These operations involve substantially no interaction with the user. Other operations of the methods 300 and/or 400 may be performed by in a manual fashion or semi-automatic fashion. These operations involve interaction with the user via one or more user interface presentations.

Figure 5A:
FIGS. 5A, 5B and 5C illustrate a plurality of images that may be combined to generate a processed image, in accordance with an example embodiment.
Figure 5B:
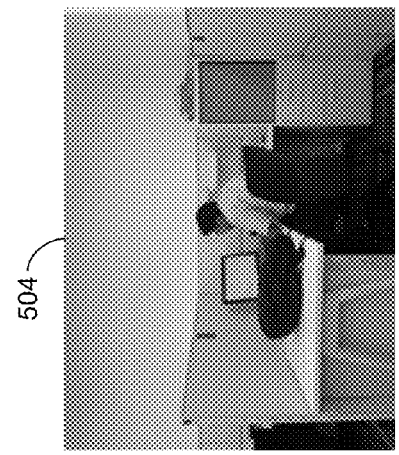
Figure 5C:
Figure 6A:
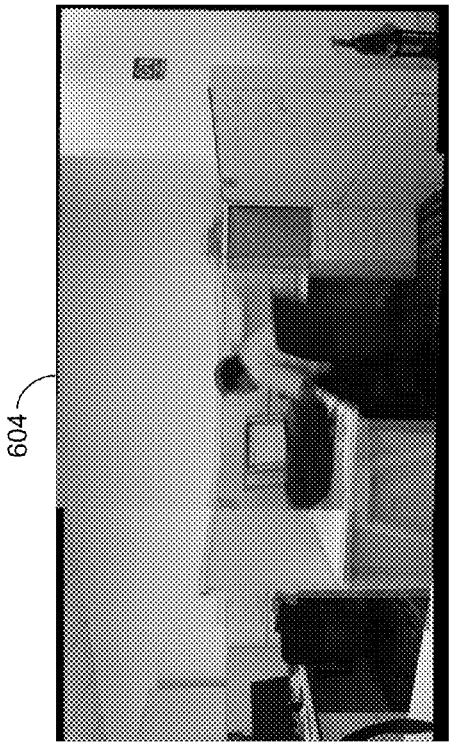
FIGS. 6A and 6B illustrate pre-processed images being generated in accordance with an example embodiment.
Figure 6B:
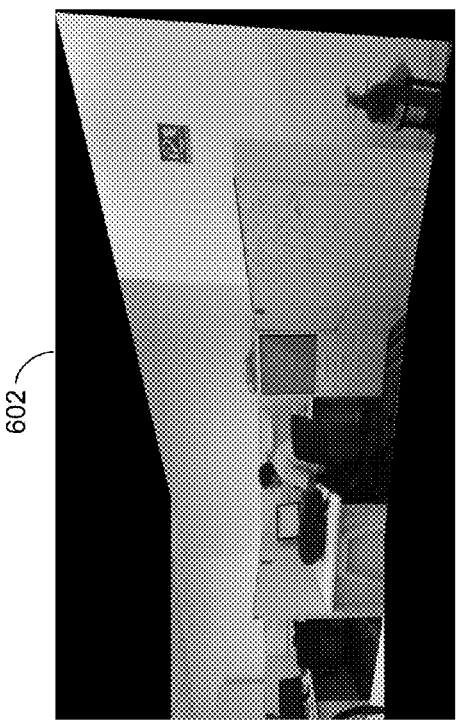

FIGS. 5A, 5B and 5C illustrate a plurality of images, for example, a first image 502, a second image 504, and a third image 506, in accordance with an example embodiment. In an embodiment, the plurality of images 502, 504, and 506 may be combined to generate panorama image. In an embodiment, the panorama image is generated by combining the plurality of images, for example the images 502, 504, and 506 by an apparatus, for example the apparatus 200 (explained with reference to FIG. 2). In an example embodiment, the plurality of images may be combined by warping and blending the subsequent images to generate the panorama image. As discussed, warping, for example alignment, may be performed in order to obtain an image in view of other image. This may be done as the two images, even though capturing the same scene may capture the information with slight difference on account of difference in an angle of capture. Accordingly, alignment of pixels may be performed to obtain the view of one image in terms of other image. Accordingly, a transformation matrix may be computed to obtain one image in the view of the other image. In an example embodiment, the transformation matrix may be computed as an 8 parameter transformation matrix (for example, using standard techniques, such as similarity, homography, affine and the like). An example pre-processed panorama image generated by performing warping using a homography transformation matrix and a similarity transformation matrix are illustrated in FIGS. 6A and 6B, respectively. In an example embodiment, the warped images may be stitched by computing a seam between the images and blending the images across the seam. The image blending techniques may involve cross-fading or morphing across transitions.

FIGS. 6A and 6B illustrate a first pre-processed image, for example, a first pre-processed image 602 and a second pre-processed image, for example, a second pre-processed image 604 in accordance with an example embodiment. As discussed with reference to FIGS. 2, 3A-3C, the first pre-processed image 602 may be a panorama image that may be generated by utilizing first transformation matrix for warping the images. In an embodiment, the first transformation matrix provides maximum number of interest point match (or inliers) between a pair of adjacent images, thereby providing a minimal error in the generated panorama image. However, as illustrated in FIG. 6A, the first pre-processed image 602 may include a stretching-out from the first image towards the last image of the generated panorama image.

The second pre-processed image 604 may be a panorama image that may be generated by utilizing similarity transformation matrix for warping the images. As is illustrated in FIG. 6B, the second pre-processed image 604 is devoid of the stretching-out effect. However, the second panorama image 604 includes a considerable mismatch error, thereby causing the shifting of few pixels in the second panorama image 604. In an embodiment, a transformation matrix may be determined between the first pre-processed image 602 and the second pre-processed image 604, and final panorama image is generated based on the transformation matrix such that the final panorama image may be devoid of the stretching-out error and the mismatch error. A final panorama image is illustrated with reference to FIGS. 7A and 7B.

Figure 7A:
FIGS. 7A and 7B illustrate processed images being generated in accordance with an example embodiment.
Figure 7B:
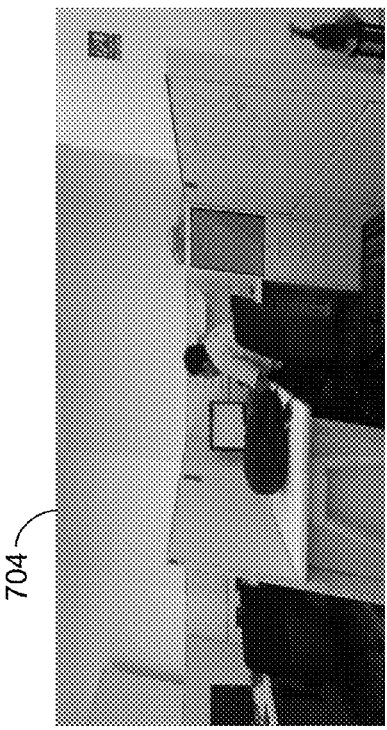

FIGS. 7A and 7B illustrate various processed images being generated in accordance with an example embodiment. For example, as illustrated in FIG. 7A, a processed image 702 is generated based on the determination of a transformation matrix between the features points of pre-processed images, for example, the first pre-processed image and the second pre-processed image (explained with reference to FIGS. 6A and 6B). The processed image 702 is shown to be devoid of stretching-out errors in the panorama image (for example, as illustrated in the first pre-processed image 602 in FIG. 6A) or mismatch errors (for example, as illustrated in the second pre-processed image 604 in FIG. 6B). Moreover, as illustrated in FIG. 7A, the field of view of the processed image 702 is more, thereby covering substantial portions of the constituent plurality of images forming the panorama image 702. In an embodiment, the black spaces in the processed image 702 obtained due to processing of the images may be removed by suitable techniques, for example an autocrop technique. A processed image 704 with black spaces removed is illustrated in FIG. 7B.

Without in any way limiting the scope, interpretation, or application of the claims appearing below, a technical effect of one or more of the example embodiments disclosed herein is to perform processing of images. As explained in FIGS. 2-7B, the processing of images may involve processing of a plurality image of images to generate a panorama image that may be free of mismatch errors and stretching-out errors. Moreover, the field of view of the processed is more, thereby covering substantial portions of the constituent plurality of images forming the panorama image. Additionally, the processed image is devoid of curve effects that appears in cylindrical panorama image, therefore the straight lines in the component images remain as straight lines in the processed (or panorama) image.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present disclosure as defined in the appended claims.

We claim:

1. A method comprising:
   extracting a set of image features from a first image and a corresponding set of image features from a second image;
   computing a first transformation matrix between the first image and the second image based on a matching of the set of image features in the first image with the corresponding set of image features in the second image;
   computing a second transformation matrix between the first image and the second image based on the matching of the set of image features in the first image with the corresponding set of image features in the second image;
   determining a first set of feature points based on the first transformation matrix, and a second set of feature points based on the second transformation matrix;
   estimating a transformation matrix between the first set of feature points and the second set of feature points; and
   aligning the second image with the first image based on the transformation matrix;
   wherein the method further comprises:
   determining a set of first transformation matrices and a set of second transformation matrices,
      wherein the set of first transformation matrices comprises the first transformation matrix between adjacent images of the first image, adjacent images of the second image and adjacent images of at least one subsequent image, and wherein the set of first transformation matrices include a set of homography transformation matrices, and
      wherein the set of second transformation matrices comprises the second transformation matrix between the adjacent images of the first image, adjacent images of the second image and adjacent images of the at least one subsequent image, and wherein the set of second transformation matrices include a set of similarity transformation matrices.

2. The method as claimed in claim 1 further comprising:
   determining a set of matching image features between the set of image features from the first image and the corresponding set of image features from the second image, the set of matching image features are used for computing the first transformation matrix and the second transformation matrix.

3. The method as claimed in claim 1, wherein feature points of the first set of feature points and feature points of the second set of feature points comprises at least one of inliers and corner points.

4. The method as claimed in claim 1, wherein estimating the transformation matrix is performed based on a feature matching between the first set of feature points and the second set of feature points until a mismatch error is determined to be less than a predetermined threshold value of mismatch error.

5. The method as claimed in claim 1, further comprising generating a panorama image based on the first image and the aligned second image.

6. The method as claimed in claim 1, further comprising:
   generating a first pre-processed image based on the first transformation matrix; and
   generating a second pre-processed image based on the second transformation matrix.

7. The method as claimed in claim 6, wherein determining the first set of feature points and the second set of feature points comprises determining feature points in the first pre-processed image and the second pre-processed image.

8. The method as claimed in claim 7, further comprising:
   performing feature matching between the first set of feature points and the second set of feature points;
   computing the transformation matrix based on the feature matching;
   computing a mismatch error based on the transformation matrix; and
   modifying the computed transformation matrix based on a determination of the mismatch error being greater than a predetermined threshold value of mismatch error.

9. An apparatus comprising:
   at least one processor; and
   at least one memory comprising computer program code, the at least one memory and the computer program code configured to, with the at least one processor, cause the apparatus to at least perform:
   extract a set of image features from a first image and a corresponding set of image features from a second image;
   compute a first transformation matrix between the first image and the second image based on a matching of the set of image features in the first image with the corresponding set of image features in the second image;
compute a second transformation matrix between the first image and the second image based on the matching of the set of image features in the first image with the corresponding set of image features in the second image;
determine a first set of feature points based on the first transformation matrix, and a second set of feature points based on the second transformation matrix;
estimate a transformation matrix between the first set of feature points and the second set of feature points; and
align the second image with the first image based on the transformation matrix;
wherein the apparatus is further caused, at least in part, to:
determine a set of first transformation matrices and a set of second transformation matrices,
wherein the set of first transformation matrices comprises the first transformation matrix between adjacent images of the first image, adjacent images of the second image and adjacent images of at least one subsequent image, and wherein the set of first transformation matrices include a set of homography transformation matrices, and
wherein the set of second transformation matrices comprises the second transformation matrix between adjacent images of the first image, adjacent images of the second image and adjacent images of the at least one subsequent image, and wherein the set of second transformation matrices include a set of similarity transformation matrices.

10. The apparatus as claimed in claim 9, wherein the apparatus is further caused, at least in part, to:
determine a set of matching image features between the set of image features from the first image and the corresponding set of image features from the second image, the set of matching image features are used for computing the first transformation matrix and the second transformation matrix.

11. The apparatus as claimed in claim 9, wherein feature points of the first set of feature points and feature points of the second set of feature points comprises at least one of inliers and corner points.

12. The apparatus as claimed in claim 9, wherein the apparatus is further caused, at least in part, to:
perform estimation of the transformation matrix based on a feature matching between the first set of feature points and the second set of feature points until a mismatch error is determined to be less than a predetermined threshold value of mismatch error.

13. The apparatus as claimed in claim 9, wherein the apparatus is further caused, at least in part, to:
generate a panorama image based on the first image and the aligned second image.

14. The apparatus as claimed in claim 9, wherein the apparatus is further caused, at least in part, to:
generate a first pre-processed image based on the first transformation matrix; and generate a second pre-processed image based on the second transformation matrix.

15. The apparatus as claimed in claim 14, wherein the apparatus is further caused, at least in part, to:
determine the first set of feature points and the second set of feature points based on determining feature points in the first pre-processed image and the second pre-processed image.

16. The apparatus as claimed in claim 15, wherein the apparatus is further caused, at least in part, to:
perform feature matching between the first set of feature points and the second set of feature points;
compute the transformation matrix based on the feature matching;
compute a mismatch error based on the transformation matrix; and
modify the computed transformation matrix based on a determination of the mismatch error being greater than a predetermined threshold value of mismatch error.

17. A computer program product comprising at least one non-transitory computer-readable storage medium, the non-transitory computer-readable storage medium comprising a set of instructions, which, when executed by one or more processors, cause an apparatus to at least perform:
extract a set of image features from a first image and a corresponding set of image features from a second image;
compute a first transformation matrix between the first image and the second image based on a matching of the set of image features in the first image with the corresponding set of image features in the second image;
compute a second transformation matrix between the first image and the second image based on a matching of the set of image features in the first image with the corresponding set of image features in the second image;
determine a first set of feature points based on the first transformation matrix, and a second set of feature points based on the second transformation matrix;
estimate a transformation matrix between the first set of feature points and the second set of feature points; and
align the second image with the first image based on the transformation matrix;
wherein the apparatus is further caused, at least in part, to:
determine a set of first transformation matrices and a set of second transformation matrices,
wherein the set of first transformation matrices comprises the first transformation matrix between adjacent images of the first image, adjacent images of the second image and adjacent images of at least one subsequent image, and wherein the set of first transformation matrices include a set of homography transformation matrices, and
wherein the set of second transformation matrices comprises the second transformation matrix between adjacent images of the first image, adjacent images of the second image and adjacent images of the at least one subsequent image, and wherein the set of second transformation matrices include a set of similarity transformation matrices.

18. The computer program product as claimed in claim 17, wherein the apparatus is further caused, at least in part, to:
determine a set of matching image features between the set of image features from the first image and the corresponding set of image features from the second image, the set of matching image features being configured to be utilized for computing the first transformation matrix and the second transformation matrix.

19. The method as claimed in claim 1, further comprising:
generating a first pre-processed image based on the set of first transformation matrices; and
generating a second pre-processed image based on the set of second transformation matrices.

20. The apparatus as claimed in claim 9, wherein the apparatus is further caused, at least in part, to:
generate a first pre-processed image based on the set of first transformation matrices; and generate a second pre-processed image based on the set of second transformation matrices.

* * * * *